United States Patent Office 3,230,043
Patented Jan. 18, 1966

3,230,043
MANUFACTURE OF LEAD OXIDE HYDROXIDE
Ernst Voss and Alexander Koenig, both of Frankfurt am Main, Germany, assignors to Varta Aktiengesellschaft, Hagen, Westphalia, Germany, a corporation of Germany
No Drawing. Filed Dec. 11, 1961, Ser. No. 158,599
Claims priority, application Germany, Dec. 31, 1960, A 36,409
11 Claims. (Cl. 23—146)

The present invention relates to improvements in the manufacture of lead oxide hydroxide represented by the alternative Formulas $5PbO \cdot 2H_2O$ or $3PbO \cdot 2Pb(OH)_2$. Lead oxide hydroxide is a useful compound for the preparation of active masses of storage battery plates, as disclosed in our copending application Serial No. 158,598, filed on even date and entitled "Manufacture of Active Mass for Lead-Acid Storage Battery Plates, Active Masses So Produced, and Plates With Such Masses."

Conventionally, lead oxide hydroxide has been produced by dissolving lead acetate in the required amount of cold water and subsequently adjusting the pH-value of the solution with concentrated sodium hydroxide solution until it is weakly alkaline. This produces a precipitate of lead oxide hydroxide as a micro-crystalline, white powder. The precipitate is then suspended three to four times in fresh water and washed on a filter. In this conventional process, about 500 g. of lead oxide hydroxide may be obtained under the best of reaction conditions from 1000 g. of lead acetate.

Lead acetate being an expensive starting material, it is the primary object of the present invention to provide a more economical process of preparing lead oxide hydroxide.

In accordance with this invention, a portion of the starting material consists of plumbous oxide while the remainder is formed by a readily water-soluble plumbous salt, such as lead acetate, which is the preferred salt, or lead formate, lead perchlorate, lead nitrate, or the like.

The lead oxide hydroxide is precipitated from an aqueous solution of the plumbous oxide and plumbous salt by the addition of an alkaline solution, such as sodium hydroxide solution, at a temperature below 45° to 50° C.

According to one embodiment of the invention, preferably finely comminuted plumbous oxide and water-soluble plumbous salt are intimately mixed and the mixture is dissolved in hot water to produce the aqueous solution whence the lead oxide hydroxide is precipitated.

According to another embodiment, the plumbous oxide is added to an aqueous solution of the salt while the solution is heated and vigorously stirred, whereafter lead oxide hydroxide is precipitated.

Comminution of the plumbous oxide will facilitate its solution.

In both cases, the solution may be diluted and is cooled to less than 45° to 50° C. before the alkaline solution is added to precipitate the lead oxide hydroxide. The solution itself is preferably prepared in an atmosphere excluding carbon dioxide because the presence of the latter leads to the formation of basic lead carbonate which is difficult to dissolve.

Since the precipitation of the lead oxide hydroxide is practically quantitative if sufficient alkaline solution is added, it is possible to work with very dilute aqueous solutions of the plumbous oxide and salt but, for economic reasons, it is preferred to hold the volume of the solution low, i.e. to operate with concentrated solutions. It is also advantageous to hold the plumbous oxide content low enough to prevent saturation of the solution with the oxide because this will make the otherwise required filtration of the precipitate unnecessary.

As stated above, it has been found possible to dissolve in a solution of 1000 g. of lead acetate, $$Pb(CH_3COO)_2 \cdot 3H_2O$$

an additional 500 g. of plumbous oxide and to precipitate from this solution about twice the amount of lead oxide hydroxide as has been possible with the same volume of solution according to known processes. If the two lead compounds are intimately mixed in the dry state before being dissolved, the solution time is cut in half.

If chemically pure plumbous oxide is used, an equimolar amount of lead acetate, or a slight molar excess of the acetate (about 1.2 moles) suffices to dissolve the entire amount of the oxide. With other water-soluble lead salts, the molar ratios of oxide to salt change, depending on the character of the salt. For instance, at least about 6 to 7 moles of lead perchlorate are needed per mole of plumbous oxide and this ratio increases further with the use of lead nitrate or lead formate.

Preferably, about 2.5 moles of sodium hydroxide are used per mole of plumbous acetate to precipitate the lead oxide hydroxide, some excess of the sodium hydroxide being used to compensate for impurities therein. In other words, the alkaline solution is added at least in about stoichiometric amounts because, with lesser amounts of alkaline solution, basic salts are obtained.

When the sodium hydroxide solution is added to the aqueous solution of plumbous oxide and salt, a stiff paste of basic salts is first produced and, upon further addition of sodium hydroxide, the lead oxide hydroxide is precipitated.

To prevent peptizing of the precipitate, which would make further washing very difficult, the precipitate is first washed with a dilute sodium hydroxide solution, further washing being effected with pure water, if desired.

The following examples illustrate the practice of the invention without in any way limiting the same thereto:

EXAMPLE 1

1000 g. of lead acetate of the Formula $$Pb(CH_3COO)_2 \cdot 3H_2O$$

were dissolved in 1000 g. of cold water. The solution was heated to 100° C. and 500 g. of yellow plumbous oxide were added while the solution was vigorously stirred. The oxide was dissolved in about 60 minutes. While an insoluble residue of basic lead acetate may remain, it causes no trouble because it is converted to lead oxide hydroxide in the subsequent precipitating treatment. The solution was diluted with water to produce four liters of solution and was cooled to room temperature. While stirring, a solution of 225 g. of sodium hydroxide in 500 cc. of water was added to the cooled lead oxide-lead acetate solution. As soon as the precipitate of lead oxide hydroxide had settled, it was decanted four times, each time with three liters of water, 2 g. of sodium hydroxide being added to each batch of water. Similar results were obtained when the last three washings were effected with pure water. The washed precipitate was filtered and, after drying in vacuum, 980 g. of lead oxide hydroxide were obtained.

EXAMPLE 2

2.6 moles of lead acetate and 2.5 moles of plumbous oxide were intimately mixed in a grinding or milling apparatus and the resultant pulverulent mixture was dissolved, under vigorous stirring, in one liter of boiling water. The resultant solution was then treated as described in Example 1 to precipitate lead oxide hydroxide.

EXAMPLE 3

1000 g. lead perchlorate and 750 g. lead oxide are dissolved in one liter of boiling water. The solution is diluted with water to 5 liters. After this it is cooled and precipitated with a solution consisting of 130 g. sodium hydroxide in 0.5 liter of water. The precipitated lead oxide hydroxide is filtered and washed.

EXAMPLE 4

1000 g. lead nitrate and 100 g. lead oxide are boiled in 2 liters of water. The insoluble parts are filtered in hot condition, then the solution is cooled and filled with water to 5 liters. The lead oxide hydroxide is precipitated with a solution of 365 g. potassium hydroxide in 0.5 liter of water. The precipitated product thereof is filtered and washed.

We claim:
1. A process of preparing lead oxide hydroxide of the formula $5PbO \cdot 2H_2O$, suitable for preparation of the active masses of lead storage-battery plates, comprising forming an aqueous solution of plumbous oxide and a plumbous salt selected from the group consisting of lead acetate, lead formate, lead perchlorate, and lead nitrate, and then, while maintaining the temperature below about 50° C., adding at least in about a stoichiometric amount with respect to the salt, of an aqueous solution of alkali metal hydroxide to precipitate the lead oxide hydroxide, and separating the precipitated lead oxide hydroxide.

2. The process of claim 1, wherein the first solution is a sodium hydroxide solution.

3. The process of claim 1, further comprising the step of repeatedly washing the precipitated lead oxide hydroxide with water, at least the first washing being effected with a very dilute aqueous solution of sodium hydroxide.

4. The process of claim 1 wherein the plumbous salt is present in a mole ratio of from about 1:1 to 3:1 with respect to the oxide.

5. A process of preparing lead oxide hydroxide, of the formula $5PbO \cdot 2H_2O$, comprising the steps of intimately mixing finely comminuted plumbous oxide and a readily water-soluble plumbous salt selected from the group consisting of lead acetate, lead formate, lead perchlorate, and lead nitrate, preparing an aqueous solution of said mixed plumbous oxide and salt and, at a temperature below 50° C., adding at least in about a stoichiometric amount with respect to the salt, of an alkali hydroxide solution to the aqueous solution to precipitate the lead oxide hydroxide.

6. A process of preparing lead oxide hydroxide, of the formula $5PbO \cdot 2H_2O$, comprising the step of adding, at a temperature below 50° C., at least in about a stoichiometric amount with respect to the salt, of an alkali-metal hydroxide solution to an aqueous solution of plumbous oxide in an aqueous solution of a readily water-soluble plumbous salt selected from the group consisting of lead acetate, lead formate, lead perchlorate, and lead nitrate to precipitate the lead oxide hydroxide, the amount of plumbous oxide being less than that required to saturate the aqueous solution.

7. A process of preparing lead oxide hydroxide, of the formula $5PbO \cdot 2H_2O$, comprising the steps of preparing an aqueous solution of plumbous oxide in an aqueous solution of a readily water-soluble plumbous salt selected from the group consisting of lead acetate, lead formate, lead perchlorate, and lead nitrate in the absence of carbon dioxide and, at a temperature below 50° C., adding at least in about a stoichiometric amount with respect to the salt, of an alkali-metal hydroxide solution to the aqueous solution to precipitate the lead oxide hydroxide.

8. A process of preparing lead oxide hydroxide, consisting essentially of $5PbO \cdot 2H_2O$, suitable for preparation of the active masses of lead storage-battery plates, comprising forming an aqueous solution of plumbous oxide and a plumbous salt selected from the group consisting of lead acetate, lead formate, lead perchlorate, and lead nitrate, and then, at a temperature below about 50° C., adding at least in about a stoichiometric amount with respect to the salt, of an aqueous solution of alkali metal hydroxide to precipitate the lead oxide hydroxide, and separating the precipitated lead oxide hydroxide, the plumbous salt being present in at least an equimolar amount with respect to the oxide.

9. A process of forming a precipitate consisting essentially of lead oxide hydroxide of the formula $$5PbO \cdot 2H_2O$$

comprising forming an aqueous solution of plumbous oxide and a plumbous salt selected from the group consisting of lead acetate, lead formate, lead perchlorate, and lead nitrate, and then, at a temperature below about 50° C., adding at least in about a stoichiometric amount with respect to the salt, of an aqueous solution of alkali metal hydroxide to precipitate the lead oxide hydroxide.

10. A process of preparing lead oxide hydroxide of the formula $5PbO \cdot 2H_2O$, suitable for preparation of the active masses of lead storage-battery plates, comprising forming an aqueous solution of plumbous oxide and lead acetate and then, while maintaining the temperature below about 50° C., adding at least in about a stoichiometric amount with respect to the salt, of an aqueous solution of alkali metal hydroxide to precipitate the lead oxide hydroxide, and separating the precipitated lead oxide hydroxide.

11. A process of preparing lead oxide hydroxide of the formula $5PbO \cdot 2H_2O$, suitable for preparation of the active masses of lead storage-battery plates, comprising forming an aqueous solution of plumbous oxide and a plumbous salt at least as water soluble as lead acetate and then, while maintaining the temperature below about 50° C., adding at least in about a stoichiometric amount with respect to the salt, of an aqueous solution of alkali metal hydroxide to precipitate the lead oxide hydroxide, and separating the precipitated lead oxide hydroxide.

References Cited by the Examiner
UNITED STATES PATENTS
1,033,405   7/1912   Hughes 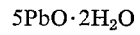 23—146 X

OTHER REFERENCES

Mellor: Comprehensive Treatise on Inorganic and Theoretical Chemistry, Longmans, Green and Co., New York, vol. 7, pages 639 to 643 and 661 to 664 (pages 641, 661 and 662 particularly relied on).

MAURICE A. BRINDISI, *Primary Examiner.*